United States Patent [19]
Eaves

[11] 3,811,213

[45] *May 21, 1974

[54] MOIRE MOTION ILLUSION APPARATUS AND METHOD

[75] Inventor: Robert B. Eaves, Wayne, Pa.

[73] Assignee: Photo-Motion Corporation, King of Prussia, Pa.

[ * ] Notice: The portion of the term of this patent subsequent to Feb. 22, 1989, has been disclaimed.

[22] Filed: Feb. 16, 1972

[21] Appl. No.: 226,846

Related U.S. Application Data

[63] Continuation-in-part of Ser. No. 877,298, Nov. 17, 1968, Pat. No. 3,643,361.

[52] U.S. Cl. .............................. 40/106.53, 40/137
[51] Int. Cl. ............................................ G09f 13/34
[58] Field of Search ........ 40/106.51, 106.54, 132 F, 40/137

[56] References Cited
UNITED STATES PATENTS
3,543,361  2/1972  Eaves............................. 40/106.53

Primary Examiner—Robert W. Michell
Assistant Examiner—John F. Pitrelli

[57] ABSTRACT

Apparatus and methods are presented for the simulation of motion through the use of moire patterning. Motion simulation is accomplished with two overlay transparent sheets imprinted with dot patterns of different frequencies. One of the sheets, having a plurality of sections of dot patterns of different frequencies, is held stationary and the other sheet, having a uniform dot pattern, is moved relative to the stationary sheet, and an illusion of motion is created on the stationary sheet by movement of moire patterns resulting from the interaction of the dot patterns on the two sheets. The sections on the stationary sheet may be scraped or otherwise burnished to remove some of the dot patterns in the section to generate open areas whereby both uniformity of light transmission and motion illusion may be enhanced.

14 Claims, 10 Drawing Figures

PATENTED MAY 21 1974 3,811,213

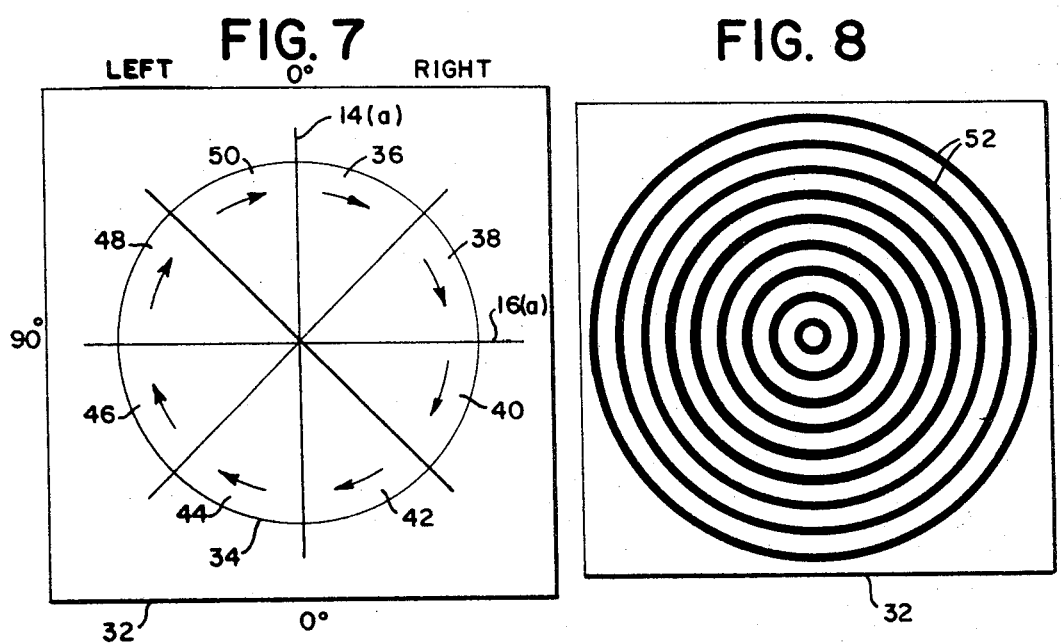
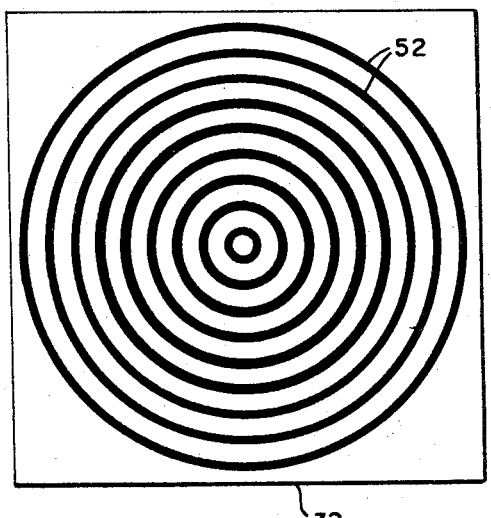
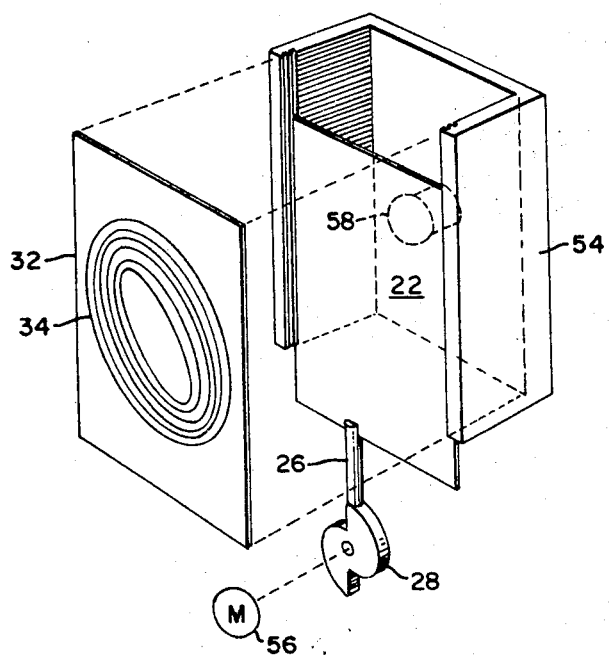

MOIRE MOTION ILLUSION APPARATUS AND METHOD

CROSS REFERENCE TO RELATED APPLICATIONS:

This application is a continuation-in-part of United States application Ser. No. 877,298, filed Nov. 17, 1968, now U.S. Pat. No. 3,643,361.

BACKGROUND OF THE INVENTION

1. Field of the Invention

This invention relates to the field of display devices in which illusions of motion, and also depth if desired, are created. More particularly, this invention relates to the field of motion simulation or illusion with transparent materials having dot patterns imprinted thereon.

2. Description of the Prior Art

Many kinds of display devices are known in the art in which motion and depth illusion are created. Some of these display devices are highly sophisticated and do an excellent job of simulating motion or depth; some of these devices are unsophisticated and do not do a good job of simulating motion or depth. Some of the devices known in the art are hard on the eyes in that the observer encounters varying degrees of actual discomfort when looking at the devices. Among some of the types of display devices known in the art are those which employ polarizing effects. Some of the devices employing polarizing effects require special viewing glasses, while others have eliminated the need for viewing glasses, at least as so far as motion simulation is concerned. Another type of device known in the art is the lenticular type of device in which a pattern of lenses is employed to create a motion or depth effect. Lenticular devices of semicylindrical lenses or semispherical lenses are well known.

Some of the lenticular devices employ a type of moire patterning to assist in the creation of the desired illusion. Such moire patterning has typically involved the use of overlapping patterns of semicylindrical lenticular surfaces or semispherical lenticular surfaces on opposed surfaces or on opposite sides of a sheet of display material. However, these lenticular devices have many significant deficiencies. For example, the creation of the lenticular patterns is difficult to accomplish, especially if it is desired to have patterns on both sides of a single sheet; only one pattern can be effectively created on a given surface; and also, these lenticular devices often result in wavy or blurred images and are often uncomfortable for the observer to view.

Moire patterning for motion illusion has also been suggested wherein movable sheets are employed, each having a line or line patterns therein, but these devices have been very limited in that they have only a single lens or line pattern on each sheet.

By way of some general information it should perhaps be noted that moire patterning has been well known for many years. In some instances moire patterns have been deliberately created to produce desired effects. At one time moire patterned fabrics were quite popular. Also, the lenticular devices discussed above make use of a type of moire patterning. In other situations, however, for example, such as in half-tone printing, moire patterns may be inadvertently generated and have to be eliminated or avoided.

Representative patents in which lenticular devices and moire patterns are discussed or suggested are as follows: Etbauer U.S. Pat. No. 2,210,806, Gruetzner U.S. Pat. No. 2,724,312, Nadeau U.S. Pat. No. 3,151,520, Pluess U.S. Pat. No. 3,158,479, Howe et al U.S. Pat. No. 3,161,509, Brown U.S. Pat. No. 3,167,741, Ferris et al U.S. Pat. No. 3,178,993, Rowland U.S. Pat. No. 3,357,773, Rowland U.S. Pat. No. 3,357,772, Rowland U.S. Pat. No. 3,312,006, Rowland U.S. Pat. No. 3,421,805, Jerothe et al U.S. Pat. No. 3,264,164, Tanaka U.S. Pat. No. 2,268,351 and Percy et al U.S. Pat. No. 2,151,301, Swarbrick U.S. Pat. No. 2,917,854, Swarbrick U.S. Pat. No. 3,370,371, Swarbrick U.S. Pat. No. 2,918,743 and Swarbrick U.S. Pat. No. 2,876,570.

SUMMARY OF THE INVENTION

In the present invention highly effective illusions of motion and depth are created through the use of printed, i.e., essentially flat two-dimensional, dot patterns which are overlayed or interacted in a plurality of different frequencies and angular relationships for cooperative effects to produce moire patterns of light and dark areas. The dot patterns are formed on transparent sheets or films, and standard techniques in the printing and graphic arts industries can be employed for formation of the dot patterns. Motion illusion is accomplished through the use of two sheets of dot patterns. One sheet, which may be referred to as a reference or activator sheet has dot patterns thereon of a constant frequency, i.e., a selected number of dots per inch. A second sheet, which may be referred to as an art or display sheet, has dot patterns thereon of several different frequencies and angular relationships in different sections of the sheet. The several sections on the art sheet may be scraped or otherwise burnished to remove some of the dot patterns in the section to generate open areas whereby both uniformity of light transmission and motion illusion may be enhanced. In accordance with the present invention the activator sheet is caused to move relative to the art sheet while light from the activator sheet, either transmitted or reflected, is transmitted through the art sheet. The several dot pattern frequencies on the art sheet are different from the single frequency of dot patterns on the activator sheet, and thus moire patterns of lighter and darker areas are created by the overlapping of the two sheets when they are stationary with respect to each other. Movement of the activator sheet with respect to the art sheet causes changes in the positions of the light and dark areas of the moire patterns and thus very effective illusion of motion can be created by appropriate selection of relative dot pattern frequencies and angular relationships.

Depth illusion can also be created by a moire patterning technique wherein selected portions of the front and back surfaces of the art sheet are imprinted with dot patterns of slightly different frequencies with respect to each other, which frequencies are substantially different from the frequencies of the dot patterns of the interacting portions of the art sheet and the activator sheet. Extremely effective depth illusion can be created in this manner, especially if the art sheet is of some finite thickness on the order of 0.03 inches or greater.

The dot patterns employed in the present invention can be printed on transparent sheets in accordance with standard printing techniques such as, for example, lithography, silk screening, and photogelation printing so that a particularly facile method is available for creating the necessary plural dot patterns; and furthermore, numerous copies of a particular display can be created by such standard printing processes. Furthermore, the motion and depth illusion techniques can be employed jointly or separately, and either can be used in connection with other techniques.

Accordingly, one object of the present invention is to provide a novel and improved method and apparatus for effecting motion illusion.

Another object of the present invention is to provide a novel and improved method and apparatus for effecting motion illusion through the use of moire patterning techniques.

Still another object of the present invention is to provide a novel and improved method and apparatus for effecting motion illusion through moire patterning and standard printing techniques.

Still another object of the present invention is to provide a novel and improved method and apparatus for effecting motion illusion by the use of two separate and differently patterned dotted seets, one sheet being movable with respect to the other and that other sheet having a plurality of dot patterns thereon of different frequencies and angular orientation, which dot patterns may be scraped or burnished for partial removal thereof for creation of open areas to enhance light transmission and motion characteristics.

Still another object of the present invention is to provide a novel and improved method and apparatus for effecting motion and depth illusion through the use of two separate and differently patterned dotted sheets, one of which sheets is movable with respect to the other to create an illusion of motion of patterns on that other sheet, the dot pattern frequencies employed for depth illusion being significantly different from the dot pattern frequencies for motion illusion.

Other objects and advantages will be apparent and understood to those skilled in the art from the following detailed description and drawings.

BRIEF DESCRIPTION OF THE DRAWINGS

Referring now to the drawings, wherein like elements are numbered alike in the several figures;

FIG. 7 is a diagramatic representation of a circle arranged on an art sheet in segments of differing dot pattern frequencies for motion illusion in accordance with the present invention.

FIG. 8 is a view showing an alternative arrangement of the circle of FIG. 7 for enhancing motion illusion.

FIG. 9 is an exploded view showing the cooperative arrangement between the activator sheet and the art sheet in typical display apparatus to produce motion illusion on the art sheet.

DESCRIPTION OF THE PREFERRED EMBODIMENT

Figure 1:
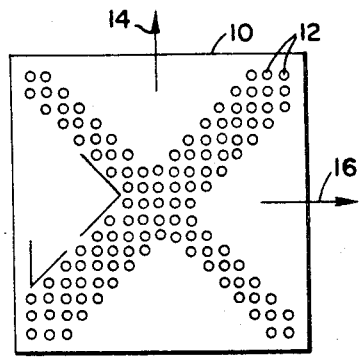
FIG. 1 is a view of a dot patterned sheet in accordance with the present invention, the dot patterns being enlarged for purposes of illustration.

Referring now to FIG. 1, a transparent plastic sheet 10 is shown having opaque dots 12 printed on one surface thereof. Sheet 10 may be of a material such as triacetate, or clear rigid vinyl, or any clear material and, as stated above, the opaque dots 12 are printed thereon by standard printing techniques. As shown in FIG. 1, the dots are essentially arranged in rows wherein the dots are equally spaced from each other. Accordingly, the dots or lines of dots can be adequately or properly characterized by referring to the frequencies of dots, i.e., the number of dots per inch in any selected direction. While only part of the sheet of FIG. 1 is shown with the dots imprinted thereon, it will be understood that the entire sheet is covered with dots and the partial showing of FIG. 1 is only for ease of illustration. Also, it will be noted that two mutually perpendicular axes 14 and 16 (indicated merely to establish an orientation and a convention) are shown for sheet 10, and the dots from rows which may be considered to be inclinded at 45° angles to these axes or may be considered in directions in alignment with these axes. The convention with respect to identifying the direction of the dots is arbitrary so long as the same convention is adopted for all sheets in a display system, and for the purposes of the present description the convention is adopted whereby the rows of dots are considered at 45° degree angles to the axes 14 and 16. Also, it will be understood that the dot patterns shown in FIG. 1 are enlarged for purposes of illustration; the opaque dots 12 are actually each individually very small, on the order of .008 inches. It should also be noted that the dots can be square or other shapes rather than round.

Figure 2:
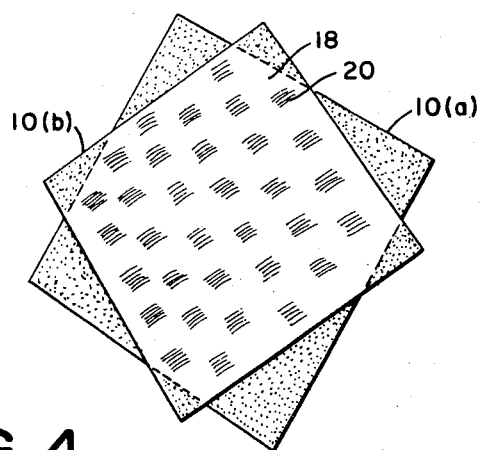
FIG. 2 is a representation of two overlayed dot patterned sheets whereby a moire pattern is created.

Referring now to FIG. 2, a representation is depicted of a moire pattern of alternating light and dark areas 18 and 20 resulting from the overlapping of two transparent sheets 10(a) and 10(b), each of which has dot patterns printed thereon in accordance with the sheet of FIG. 1. The frequencies of dots are slightly different for each of the two sheets 10(a) and 10(b) and the dots may be in different axial orientations. For example, sheet 10(a) may have a dot frequency of 60 lines of dots per inch and sheet 10(b) may have a dot frequency of 62 lines of dots per inch. As indicated above, the individual dots of a dimension of .008 inches are individually so small that they effectively cannot be seen individually. However, when the two transparent screens 10(a) and 10(b) are placed on top of each other the interaction between the dot patterns results in overlapping of opaque dotted areas in some locations and an alignment of dotted areas in other locations so that a composite pattern of light area 18 and dark areas 20 is generated, the composite pattern being known as a moire pattern. In accordance with the present invention one sheet having a dot pattern of a constant frequency, referred to as the activator sheet, is caused to move with respect to another stationary transparent sheet. The stationary sheet has a plurality of dot patterns of different frequencies or different angular inclinations of the dots from the activator sheet, i.e., having dot patterns of two or more frequencies, each of which is a different frequency from the activator sheet. This stationary sheet is referred to as an art sheet. The motion of the activator sheet with respect to the art sheet creates, as will be more fully described hereinafter, a very effective illusion of motion on the surface of the art sheet. Of course, the item "stationary" means that the art sheet does not move relative to the activator sheet, but both could be moved together, such as in a movable base.

Figure 5:
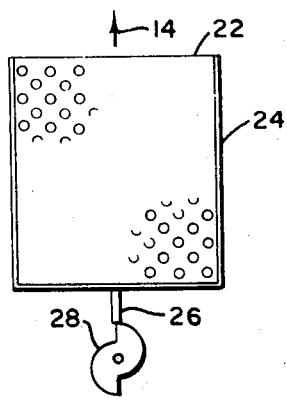
FIG. 5 is a showing of one method of moving the activator or reference sheet of the present invention.

Referring now to FIG. 5, an activator sheet 22 having a dot pattern thereon is shown. Activator sheet 22 is in all essential respects similar to sheet 10 described with respect to FIG. 1, e.g., it is transparent and has an opaque dot pattern thereon of a constant number of dots per inch over one entire surface (although the dot pattern is shown only on parts of the surface for ease of illustration) and it will presumably range in thickness from .001 inch to .04 inch. However, the sheet shown with respect to FIG. 5 is assigned a separate reference numeral since it will function in the present invention as a separately identifiable activator sheet cooperating with another sheet, to be known as the art sheet. Activator sheet 22 is printed to have a dot frequency of 60 dots per inch with the inrows inclined at 45° to axis 14. Activator sheet 22 may be mounted, such as in a transparent frame 24, and structure is provided so that the sheet may be moved along one of its axes such as axis 14. To that end, a follower 26 depends from frame 24 and is in contact with a double lobe cam 28. Rotation of cam 28 in the clockwise direction results in oscillating upward and downward movement of sheet 22 along axis 14, the sheet being, of course, mounted in any kind of suitable mounting structure with respect to which it is free to oscillate. The contour of the cam generates a controlled upward motion ending in a faster downward return to start another controlled upward stroke.

Figure 6:
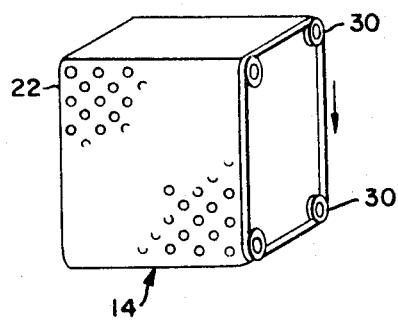
FIG. 6 is a showing of another apparatus for moving the activator sheet of the present invention.

Referring now to FIG. 6, an alternative arrangement of the activator sheet 22 is shown wherein activator sheet 22 is in the form of an endless transparent belt having a 60 dot per inch pattern printed thereon. The belt is driven by rollers 30 to provide motion of activator sheet 22 in the direction of axis 14. It will be understood that some appropriate provision, such as those shown by way of example in FIGS. 5 and 6 must be made to impart motion to activator sheet 22 in a predetermined direction. The motion of the activator sheet 22 relative to an appropriately dot patterned stationary art sheet, as will be more fully described, results in the illusion of motion on the surface of the art sheet when viewed by an appropriately positioned viewer.

Experiments have shown that the moire patterns, i.e., the alternating light and dark areas 18 and 20 described with respect to the overlay of FIG. 2, will change position, and thus appear to move, in a precise and controllable way if the rear or bottom sheet of constant dot patterns of a pair of overlayed transparent sheets is moved with respect to an appropriately varied patterned front or upper sheet. The sheets could be reversed with the front or top sheet moved with respect to the rear or bottom sheet if desired, but movement of the rear sheet is preferable.

Referring to FIG. 7, an exemplary art sheet 32 is shown which would serve as the upper or overlay sheet with respect to an activator sheet 22 in a pair of overlayed sheets. Art sheet 32 would, like activator sheet 22, be a transparent plastic sheet such as triacetate, or clear, rigid vinyl, or any clear material, having a plurality dot patterns of predetermined frequencies printed thereon. For creation of motion illusion in accordance with the present invention several dot patterns of different line-dot frequencies and/or different angles of inclination than on sheet 22 will be printed on art sheet 32; however, for purposes of initial explanation and presentation of experimental data for use in the present invention, sheet 32 will first be discussed in the context of uniform dot patterns of constant frequency on the entire upper surface thereof.

Assuming that an art sheet 32 is overlayed with respect to an activator sheet 22 and viewed with light transmitted through or reflected from sheet 22, a moire pattern of alternating light and dark areas will appear on the surface of sheet 32 if the frequencies of the dot patterns or the angles of inclination of the rows of dots on the two sheets are slightly different. Experiments have shown that the positions of the light and dark areas of the moire pattern appearing on sheet 32 will change if sheet 22 is moved with respect to sheet 32. Assuming, for the sake of explanation, that sheets 22 and 32 each have printed on their entire surfaces uniform dot patterns of slightly different frequencies on the two sheets, the movement of sheet 22 with respect to sheet 32 will cause the entire moire pattern on sheet 32 to change in accordance with the characteristics of the motion of sheet 22, the frequency difference between the dot patterns on the two sheets, and the angular relationship between the rows of dots on the two sheets.

A convention is depicted in FIG. 7 to discuss the relationship between the dot patterns on the two sheets and the changing position of the moire pattern. Axes 14(a) and 16(a) correspond, respectively, to axes 14 and 16 of activator sheet 22. Four quadrants of 0°–90° are shown in FIG. 7 for purposes of illustration, with the upward pair of quadrants being indicated with a plus (+) sign and the lower pair of quadrants being indicated with a minus (−) sign to indicate direction of change of position of the moire pattern toward the top or bottom edge of sheet 32. As stated above, movement of the moire pattern will be a function of the parameters of dot pattern frequency on the activator sheet, dot pattern frequency on the art sheet, the angular relationship of the rows of the dot patterns, and the direction and speed of movement of the activator sheet. Another characteristic or parameter of the moire of significance is the "beat" of the moire pattern. Each combination of an activator sheet and an art sheet (or a part thereof) will have a distinctive beat, i.e., repeating dark areas, depending on the frequencies of dot patterns and the angular relationship between the dot patterns on the two sheets. At the start of movement of the activator sheet an initial moire pattern exists, and that pattern will be cyclically repeated depending on the frequency of the dot pattern on the activator sheet. For example, with a 60 dot per inch pattern frequency on the activator sheet a complete cycle will occur from the original moire pattern through whatever transition occurs to a repetition of the original moire pattern for each 1/60 of an inch of movement of the activator sheet. Hence, the larger the characteristic beat of the interacting dot patterns on the activator and art sheets, the faster will be the illusion of motion.

Experimental data is presented immediately below for an activator sheet having a dot frequency of 60 dots per inch and several different overlay art sheets of dot frequencies ranging from 55 dots per inch to 65 dots per inch. This experimental data is keyed to the convention shown in FIG. 7 so that the column labeled "Degrees Right or Left of Activator Axis" refers to the angle of inclination of the axis 14(a) of each of the art sheets with respect to vertical axis 14 of the activator sheet (i.e., sheets 32 are placed with there axes 14(a) in other than a vertical direction); the letters "R" and "L" indicate directions right or left of axis 14; the plus and minus signs indicate movement of the moire pattern toward the top or bottom edge, respectively, of sheet 34, and the "Beats Per Inch" column indicates the number of times the dark areas of a particular pattern appear in each lineal inch of the screen. The data was compiled for movement of activator sheet 22 along axis 14 in a controlled speed of 1 inch per 15 seconds in upward direction only, via a cam element such as cam 28.

55 DOT PER INCH SCREEN

| Degrees Right or Left of Activator Axis | Direction of Movement of Moire, Degrees | Beats/Inch |
| --- | --- | --- |
| 0.0 | + 0.0 | 5.0 |
| 1.0 R | +12.0 L | 5.2 |
| 1.5 R | +17.0 L | 5.4 |
| 2.0 R | +20.0 L | 5.5 |
| 2.5 R | +25.5 L | 5.8 |
| 3.0 R | +29.5 L | 6.0 |
| 4.0 R | +37.5 L | 6.6 |
| 5.0 R | +43.0 L | 7.2 |
| 6.0 R | +48.0 L | 8.0 |
| 0.0 | + 0.0 | 5.0 |
| 1.0 L | +12.0 R | 5.2 |
| 1.5 L | +17.0 R | 5.3 |
| 2.0 L | +20.5 R | 5.5 |
| 2.5 L | +25.5 R | 5.6 |
| 3.0 L | +29.5 R | 6.0 |
| 4.0 L | +37.5 R | 6.6 |
| 5.0 L | +43.0 R | 7.2 |
| 6.0 L | +48.0 R | 8.0 |

57 DOT PER INCH SCREEN

| Degrees Right or Left of Activator Axis | Direction of Movement of Moire, Degrees | Beats/Inch |
| --- | --- | --- |
| 0.0 | + 0.0 | 2.8 |
| 0.5 R | +11.5 L | 3.0 |
| 1.0 R | +19.0 L | 3.2 |
| 1.5 R | +26.0 L | 3.4 |
| 2.0 R | +35.0 L | 3.6 |
| 2.5 R | +41.5 L | 4.0 |
| 3.0 R | +45.5 L | 4.4 |
| 3.5 R | +49.5 L | 4.8 |
| 4.0 R | +52.5 L | 5.2 |
| 5.0 R | +58.5 L | 6.0 |
| 6.0 R | +62.5 L | 6.0 |
| 0.0 | + 0.0 | 2.8 |
| 0.5 L | +11.5 R | 3.0 |
| 1.0 L | +19.0 R | 3.2 |
| 1.5 L | +26.0 R | 3.4 |
| 2.0 L | +35.0 R | 3.6 |
| 2.5 L | +41.5 R | 4.0 |
| 3.0 L | +45.5 R | 4.4 |
| 3.5 L | +49.5 R | 4.8 |
| 4.0 L | +52.5 R | 5.2 |
| 5.0 L | +58.5 R | 6.0 |
| 6.0 L | +62.5 R | 6.9 |

59 DOT PER INCH SCREEN

| Degrees Right or Left of Activator Axis | Direction of Movement of Moire, Degrees | Beats/Inch |
| --- | --- | --- |
| 0.0 | + 0.0 | .8 |
| 0.5 R | +31.0 L | .9 |
| 1.0 R | +51.5 L | 1.4 |
| 1.5 R | +63.5 L | 1.8 |
| 2.0 R | +68.5 L | 2.3 |
| 2.5 R | +72.0 L | 2.8 |
| 3.0 R | +73.0 L | 3.3 |
| 3.5 R | +76.5 L | 3.8 |
| 4.0 R | +77.5 L | 4.2 |
| 5.0 R | +78.5 L | 5.3 |
| 8.0 R | +82.0 L | 8.6 |
| 0.0 | + 0.0 | .8 |
| 0.5 L | +31.0 R | .9 |
| 1.0 L | +51.5 R | 1.4 |
| 1.5 L | +63.5 R | 1.8 |
| 2.0 L | +68.5 R | 2.3 |
| 2.5 L | +72.0 R | 2.8 |
| 3.0 L | +73.0 R | 3.3 |
| 3.5 L | +76.5 R | 3.8 |
| 4.0 L | +77.5 R | 4.2 |
| 5.0 L | +78.5 R | 5.3 |
| 8.0 L | +82.0 R | 8.6 |

60 DOT PER INCH SCREEN

| Degrees Right or Left of Activator Axis | Direction of Movement of Moire, Degrees | Beats/Inch |
| --- | --- | --- |
| 0.0 | 0.0 | 0 or ∞ |
| 0.5 R | 90.0 L | 0.4 |
| 1.0 R | 90.0 L | 1.0 |
| 1.5 R | 90.0 L | 1.8 |
| 2.0 R | 90.0 L | 2.2 |
| 2.5 R | 90.0 L | 2.8 |
| 3.0 R | 90.0 L | 3.4 |
| 3.5 R | 90.0 L | 3.8 |
| 4.0 R | 90.0 L | 4.4 |
| 5.0 R | 90.0 L | 5.6 |
| 8.0 R | 90.0 L | 8.0 |
| 0.0 | 0.0 | 0 or ∞ |
| 0.5 L | 90.0 R | 0.4 |
| 1.0 L | 90.0 R | 1.0 |
| 1.5 L | 90.0 R | 1.8 |
| 2.0 L | 90.0 R | 2.2 |
| 2.5 L | 90.0 R | 2.8 |
| 3.0 L | 90.0 R | 3.4 |
| 3.5 L | 90.0 R | 3.8 |
| 4.0 L | 90.0 R | 4.4 |
| 5.0 L | 90.0 R | 5.6 |
| 8.0 L | 90.0 R | 8.0 |

61 DOT PER INCH SCREEN

| Degrees Right or Left of Activator Axis | Direction of Movement of Moire, Degrees | Beats/Inch |
| --- | --- | --- |
| 0.0 | − 0.0 | 1.0 |
| 0.5 R | −24.0 L | 1.1 |
| 1.0 R | −43.0 L | 1.4 |
| 1.5 R | −55.5 L | 1.9 |
| 2.0 R | −63.5 L | 2.3 |
| 2.5 R | −69.0 L | 2.8 |
| 3.0 R | −73.5 L | 3.2 |
| 3.5 R | −75.5 L | 3.7 |
| 4.0 R | −78.0 L | 4.3 |
| 5.0 R | −81.0 L | 5.3 |
| 8.0 R | −86.0 L | 8.6 |
| 0.0 | − 0.0 | 1.0 |
| 0.5 L | −24.0 R | 1.1 |
| 1.0 L | −43.0 R | 1.4 |
| 1.5 L | −55.5 R | 1.9 |
| 2.0 L | −63.4 R | 2.3 |
| 2.5 L | −69.0 R | 2.8 |
| 3.0 L | −73.5 R | 3.3 |
| 3.5 L | −75.5 R | 3.7 |
| 4.0 L | −78.0 R | 4.3 |
| 5.0 L | −81.0 R | 5.3 |
| 8.0 L | −86.0 R | 8.6 |

63 DOT PER INCH SCREEN

| Degrees Right or Left of Activator Axis | Direction of Movement of Moire, Degrees | Beats/Inch |
| --- | --- | --- |
| 0.0 | − 0.0 | 3.0 |
| 0.5 R | −11.0 L | 3.1 |
| 1.0 R | −18.5 L | 3.2 |

| 1.5 R | −26.0 L | 3.4 |
| 2.0 R | −34.0 L | 3.7 |
| 2.5 R | −41.5 L | 4.0 |
| 3.0 R | −46.5 L | 4.4 |
| 3.5 R | −51.0 L | 4.7 |
| 4.0 R | −54.5 L | 5.3 |
| 5.0 R | −62.5 L | 6.2 |
| 6.0 R | −67.0 L | 7.1 |
| 7.0 R | −71.5 L | 8.1 |
| 8.0 R | −74.5 L | 9.3 |
| 0.0 | − 0.0 | 3.0 |
| 0.5 L | −11.0 R | 3.1 |
| 1.0 L | −18.5 R | 3.2 |
| 1.5 L | −26.0 R | 3.4 |
| 2.0 L | −34.0 R | 3.7 |
| 2.5 L | −41.5 R | 4.0 |
| 3.0 L | −46.5 R | 4.4 |
| 3.5 L | −51.0 R | 4.7 |
| 4.0 L | −54.5 R | 5.3 |
| 5.0 L | −62.5 R | 6.2 |
| 6.0 L | −67.0 R | 7.1 |
| 7.0 L | −71.5 R | 8.1 |
| 8.0 L | −74.5 R | 9.3 |

65 DOT PER INCH SCREEN

| Degrees Right or Left of Activator Axis | Direction of Movement of Moire, Degrees | Beats/Inch |
|---|---|---|
| 0.0 | − 0.0 | 5.0 |
| 1.0 R | −11.5 L | 5.1 |
| 1.5 R | −18.5 L | 5.3 |
| 2.0 R | −24.0 L | 5.5 |
| 2.5 R | −29.5 L | 5.8 |
| 3.0 R | −34.5 L | 6.0 |
| 4.0 R | −43.0 L | 6.6 |
| 5.0 R | −49.5 L | 7.4 |
| 6.0 R | −56.0 L | 8.3 |
| 0.0 | − 0.0 | 5.0 |
| 1.0 L | −11.5 R | 5.1 |
| 1.5 L | −18.5 R | 5.3 |
| 2.0 L | −24.0 R | 5.5 |
| 2.5 L | −29.5 R | 5.8 |
| 3.0 L | −34.5 R | 6.0 |
| 4.0 L | −43.0 R | 6.6 |
| 5.0 L | −49.5 R | 7.4 |
| 6.0 L | −56.0 R | 8.3 |

As can be seen from the foregoing experimental data, the motion of the activator sheet with respect to a stationary art sheet results in transition or movement of the moire pattern in accordance with the particular parameters of the sheets involved. The movement of the moire patterns will be in different directions and at different speeds depending on those parameters, and the present invention employs this moire pattern motion to create illusions of motion in patterns of art work selectively printed on an art sheet 32. The patterns are printed in different frequencies of dots per inch and at different angles of inclination on the art sheet to achieve varied and desired illusions of motion.

A typical example will serve to illustrate the manner in which a particular desired pattern can be formed on the art sheet with a plurality of different dot pattern frequencies and angles of inclination, both of which are required in order to create a desired illusion of motion. Still referring to FIG. 7, assume that it is desired to display a circle 34 on art sheet 32 with the circle appearing to rotate in the direction indicated by the arrows. Resort can then be had to data such as that presented above to select dot patterns for various segments of the circle in order to achieve the desired illusion of motion. The data is, of course, related to the dot frequency of the activator sheet. Continuing with the assumption that a dot frequency of 60 lines per inch is used for the activator sheet, the data presented above can be employed to create a circle 34 for desired motion effects once a selection is made as to the desired beat speed of the display. Assuming that a beat speed of approximately three beats per inch is desired, circle 34 is then divided into segments 36, 38, 40, 42, 44, 46, 48 and 50 for purposes of forming each of these sections on a composite art sheet with different dot frequencies and angles of inclination in each of the sections. Noting that the entire circle will appear to rotate about its center point of each of the individual sections is caused to appear to move in the direction indicated by the arrows in each section, resort to the data presented above reveals that illusions of motion for each section can be obtained by the use of dot frequencies as set forth in the following table wherein frequencies and angle of inclination and resultant direction of moire motion at approximately the required beats per inch are set forth.

| Section | Screen Frequency Dots/Inch | Screen Angle, Degrees | Moire Direction Degrees | Beats/Inch |
|---|---|---|---|---|
| 36 | 61 | 2.5 L | −69.0 R | 2.8 |
| 38 | 63 | 1.0 L | −18.5 R | 3.2 |
| 40 | 63 | 1.0 R | −18.5 L | 3.2 |
| 42 | 61 | 2.5 R | −69.0 L | 2.8 |
| 44 | 59 | 2.5 R | +72.0 L | 2.8 |
| 46 | 57 | 1.0 R | +19.0 L | 3.2 |
| 48 | 57 | 1.0 L | +19.0 R | 3.2 |
| 50 | 59 | 2.5 L | +72.0 R | 2.8 |

To summarize the significance of the foregoing table, a circle 34 wherein the eight sections are printed with the indicated dot pattern frequencies aligned with respect to a vertical axis 14 of an activator sheet with the indicated angular relationship will result in a composite wherein moire patterns, formed from overlaying the composite art sheet with the activator sheet of a frequency of 60 lines per inch, will appear to move in the directions indicated by the arrows when the activator sheet is oscillated along its axis 14.

The composite art sheet 34 having the various segments 36–50 of different frequency patterns thereon is formed through a series of steps. First of all, sheets of uniform line-dot frequency are assembled for the various desired frequencies. Segments of the desired shape with the axis 14 (a) of each sheet inclined at the appropriate angle to the vertical are then cut, such as with an art knife, and the appropriate segments are then bonded to a clear plastic sheet to form a composite. A positive print, preferable a contact print, is then made of that composite by standard photographic techniques so that a positive print is thereby obtained of the several segments of different dot pattern frequencies. Assuming lithographic techniques are used, a positive offset lithographic plate is then made from that positive print by standard techniques, and that lithographic plate may, if desired, be made of very durable material such as aluminum in accordance with known lithographic plate technology. The lithographic plate thus created is a composite made up of several segments of different dot frequencies and angles of inclination in each segment. This lithographic plate is then used to print on a clear transparent plastic sheet whereby an art sheet 32 is formed having the desired circular pattern with the segments of different dot pattern frequencies. Of course, many such identical sheets can be printed limited only by the life of the printing plate. The art sheet thus printed can be displayed in front of an activator sheet, and the desired illusion of motion on the printed surface of the art sheet can then be achieved by simple oscillating motion of the activator sheet.

The illusion of motion thus created can, if desired, be enhanced by any standard art techniques. For example, movement of the circle described with respect to FIG. 7 can be enhanced by the technique shown in FIG. 8 wherein a series of bands or rings 52 is printed on the surface of sheet 32. These bands will tend to smooth or round out the apparent motion of the circle. Of course, it will be understood that the visual aid suggested in FIG. 8 is merely one illustration of a possible enhancement technique, and any other such techniques can be used The actual apparatus in which the art sheet 32 is displayed for viewing can take on several forms. FIG. 9 shows one such form wherein a light box 54 is used. The art sheet 34 is mounted in a slot in a stationary position at the front of the light box shown in an exploded view in FIG. 9 and art sheet 22 is mounted in a slot for oscillating motion as imparted by follower 26 in contact with cam 28 which is driven by a suitable motor 56. A suitable light source 58 illuminates the rear of transparent activator sheet 22, and the light transmitted through sheet 22 is incident on the rear of transparent sheet 34 to produce the moire patterns as described above in accordance with the frequency and angular relationships between the dot patterns on sheet 34 and the dot patterns on sheet 22. Oscillatory motion of activator sheet 22 then produces the illusion of motion, as described above, on the front surface of sheet 34 for viewing by an appropriate viewer. Other display apparatus might include, for example, frames in front of a bright light, or even displays on an open counter.

It will, of course, be understood that the circle pattern and movement described herein has been cited only for purposes of illustration. Any particular desired motion illusion can be created with the above described technique of shaping, cutting, compositing and printing of art sheet segments to form a complete art sheet, such as, for example, rotation of wheels, flow diagrams, lineal or arc movement of arms of human subjects, or any other desired motion. The desired motions can, of course, be used in particular displays such as advertising displays, educational teaching aids, and many other applications. It will also be understood that the selected frequencies of 60 dots per inch for the activator sheet and 55–65 dots per inch for the segments of art sheets has been discussed herein only for purposes of illustration. Other frequencies can be employed as desired, and the data relating thereto generated similar to the data presented herein. Furthermore, although the invention has been described herein in terms of transmission of light through activator sheet 22, the invention can also be practiced by reflecting light from sheet 22. In either event it is preferable that the transmitted or reflected light be at a level of approximately 50 percent of the illuminating light. Furthermore, it should be noted that different and interesting effects can be generated by varying the speed at which the activator sheet is moved.

A number of important factors are to be noted with respect to the present invention. One such factor relates to dot pattern alignment and frequency relationships. The dot patterns on the activator sheet are in orderly repetitive straight parallel rows, and the dot patterns within each segment of the art sheet are also in orderly repetitive straight parallel rows. Both different dot pattern frequencies and angular orientations are required between the several segments of an art sheet and the activator sheet for optimum motion illusion.

As can be seen from the previously presented data, however, some art sheet segments in a total pattern might be of either the same dot frequency or angular orientation as the activator sheet depending on the desired motion effect. In any event, the dot pattern frequency and angular relationship between art sheet segments and the activator sheet must be maintained within limits for optimum effects. The dot pattern frequency of the art sheet segments should be within ± 10 percent of the dot pattern frequency of the activator sheet, and the angular orientation of the dot patterns in the art segments (i.e., the inclination of axis 14($a$) of any given art sheet segment with respect to vertical axis 14 of the activator sheet) may vary ± 8°.

Another such factor relates to separation between the sheets. Whereas in many prior art devices, especially lenticular types, sheet separation is almost or completely, intolerable, a reasonable amount of separation can be accepted in the present invention. Separation between the art sheet and the activator sheet up to 1/8 of an inch causes little or no distortion problem, and the separation between a pair of sheets can vary within that acceptable limit at different locations without encountering any significant distortion. Depending on the dot pattern frequencies, separation up to ¼ of an inch could be tolerated.

Another such factor, and one somewhat related to the separation aspect, is that of the selection of surfaces on which to print the desired dot patterns. In order to have maximum flexibility in separation tolerance, dot patterns should be printed on the opposed facing surfaces of the sheets. If the activator sheet is to be behind the art sheet in a display, the dot patterns should be on the rear surface of the art sheet and on the front surface of the activator sheet. Conversely, if the activator sheet is to be in front of the art sheet, the dot patterns should be on the back of the activator sheet and on the front of the art sheet.

Figure 10:
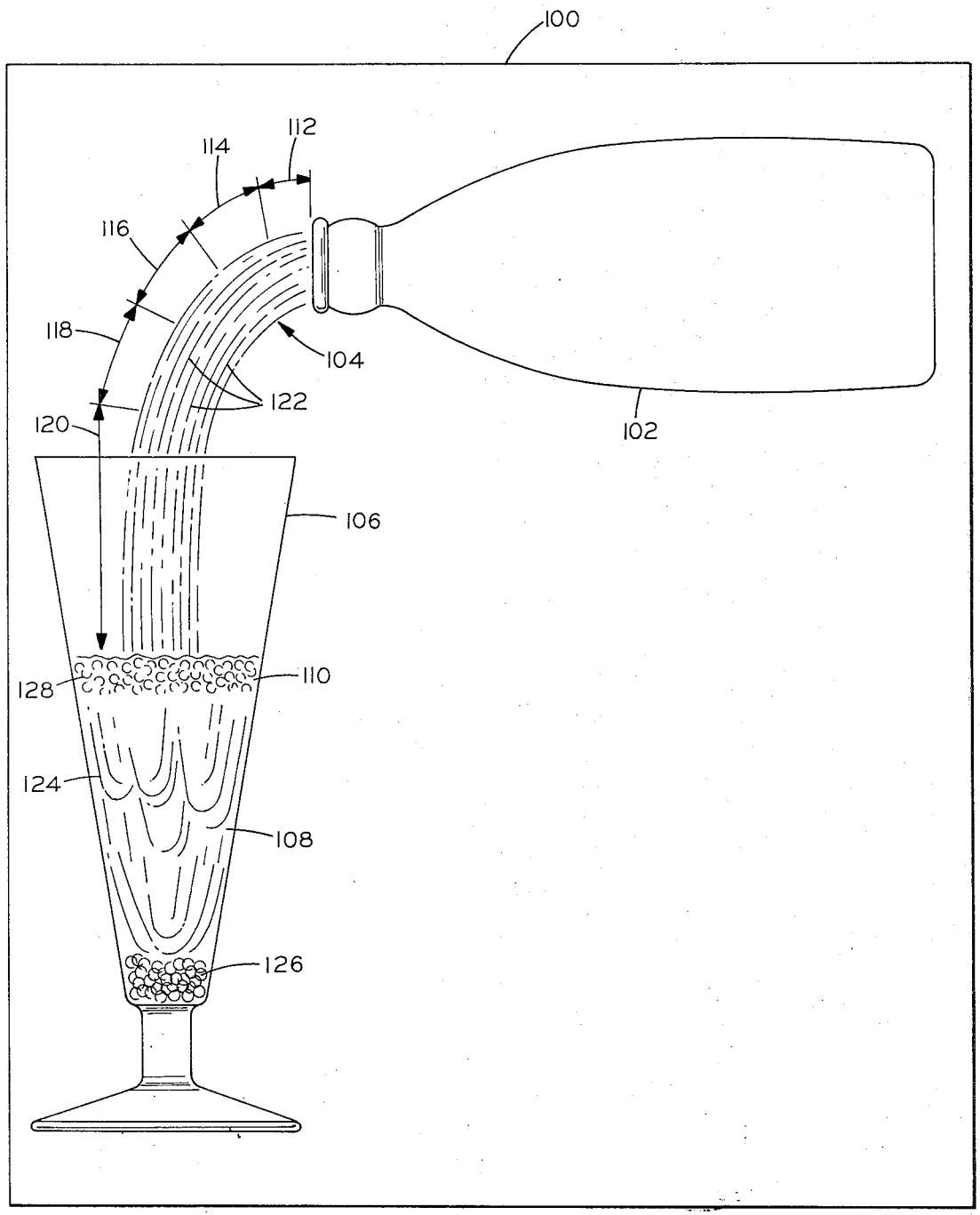
FIG. 10 is a view of an art sheet having dot sections with partial open areas.

Referring now to FIG. 10, an art sheet 100 is shown depicting a bottle 102 and a fluid stream 104 being poured into a glass 106. A typical display of this type might involve an advertisement for a brand of beer, in which event a partially filled glass would contain beer of brownish-yellowish color and a head of foam 110 of white color. For the sake of ease of illustration, the dot patterns are not particularly shown in FIG. 10, but it will be understood that dot patterns are formed as taught herein to create motion illusion for the fluid stream and the fluid in the glass.

The fluid stream 104 flows in an arc or curve as shown, and it would be composed of dot sections 112 through 120 of different frequencies and/or angular orientation in accordance with the teachings set forth above to create the illusion of motion of the stream from the bottle into the glass. In order to ease or minimize to the viewer the transition from one such dot section to the other the art sheet may be scraped or burnished to remove parts of the dot patterns in the segments to form open areas 122 in the nature of lines. The scraping physically removes the dots from the segments whereby open areas are created, and these open areas serve to enhance the motion illusion, particularly where they extend from one dot segment into another dot segment thereby minimizing the transition from one such segment into another.

Referring now to the beer segment 108, open areas 124 are formed therein in the nature of lines which reverse in direction to enhance the illusion of the fluid pouring into the glass and filling the glass. Referring also to the open areas 126 at the bottom of the glass and 128 in the foam area 110, these open areas are in the form of swirls to assist in simulating turbulence in these parts of the glass. Thus, these open areas in the dot segments enhance the illusion of motion of various types.

The open areas also serve to enhance uniformity of light transmission. Depending on the colors of various parts of a display, and also depending on the relationship of alignment of dot patterns between an art sheet and an activator sheet, noticeable and undesirable differences in the amount of light transmission could occur particularly in the sense of blocking the transmission of light. The creation of open areas in the dot sections on the art sheet eliminates this light transmission problem since there is no blockage of light in the open areas of the art sheet. Thus, light transmission can be regulated to desirable levels by formation of the open areas in the various dot pattern sections of the art sheet.

It will be understood that the open areas in an art sheet section is most conveniently formed by first printing the particular section in a uniform dot pattern frequency and then scraping, burnishing or otherwise acting upon the sections to remove part of the pattern to create open areas; but it could be formed in other ways such as by selectively depositing the dot patterns in such a way as to create open areas. In any event, regardless of the way in which the open areas are formed, the result is that in each section which has been previously described as being of uniform dot pattern frequency, that section can be characterized as having open areas or being partly open, and being partly dot patterned, the dot patterned parts being parts or segments of uniform rows of constant frequency whenever they occur in a given section. It will be apparent that in certain configurations, such as the swirl or turbulent areas 126 and 128 of FIG. 10, that the occurrence of open and patterned areas may be rather random in a section, but the dot pattern will, nevertheless, still be of a constant frequency wherever it occurs in that particular section.

The present invention also may allow for inclusion of depth illusion simulation, with the motion illusion. Many physiological and psychological factors influence depth perception. Pricipal among these factors are movement (sometimes called motion-parallax) and retinal disparity, and these factors or cues of movement and retinal disparity are accomplished by the present invention to effect depth illusion.

With respect to the motion factor, it is to be noted that an object is generally viewed with respect to a distinctly separated background, and a view is accustomed (i.e., has learned by experience) to expect certain movements or apparent movements of the background if the viewing position changes. If, while the attention of the viewer is fixed to an object, he moves to the right, the background will move to the right also. The same kind of background movement occurs with any movement of the viewing position itself rather than movement of the viewer. If, therefore, a transparency provides a background that moves in the accustomed manner behind fixed parts of an image, the viewer gets a perception of depth. When the direction of movement is reversed, the viewer may get the impression that the background is closer than the fixed image.

With respect to retinal disparity, the most important cue or factor to distance is a result of the fact that we have two eyes set about 2½ inches apart, and each eye, therefore, receives a somewhat different view of the same object. The fact that different images are received by the eyes is termed "retinal disparity." These two separate views are combined in the brain so that the one picture perceived possess real depth effect. If a transparency display provides the accustomed retinal disparity, the viewer will also experience a depth effect.

The depth simulation or illusion in the present invention is accomplished, as is the motion illusion, by the use of dot patterns. However, while the motion illusion employs two separate sheets of dot patterns with one movable relative to the other, the depth illusion is accomplished with a single sheet (the art sheet) having related dot patterns applied to opposed parallel surfaces, and no movement is employed between the two surfaces. Of course, it will be understood that two separate sheets could be employed, but the depth illusion is particularly suitable for creation with just the art sheet of the present invention.

Figure 3:
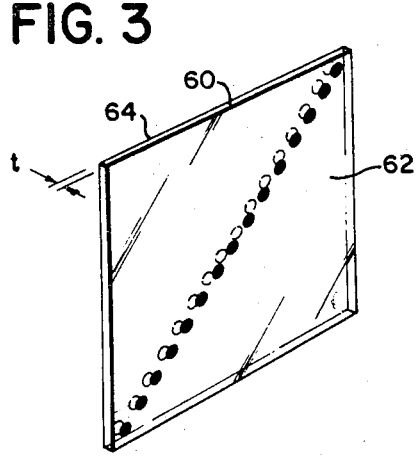
FIG. 3 is a view of a transparent sheet in which dot patterns are created on the front and rear surfaces in accordance with the present invention.

Referring to FIG. 3, a transparent sheet 60 is shown having a front surface 62 and a rear surface 64 on which dot patterns are printed. Sheet 60 can be the same material and printed in the same manner as discussed above with respect to either activator sheet 22 or the art sheet 32 employed in motion illusion. The thickness dimension t between front surface 62 and rear surface 64 must be at least 0.03 inches, and a thickness of approximately 1/8 of an inch or greater results in particularly distinct depth illusions. Of course, being opposite sides of the same sheet, surfaces 62 and 64 are planes substantially parallel to each other. The dot patterns printed on surfaces 62 and 64 are essentially similar to the dot patterns described above with respect to the activator sheets, although the dot frequency on one surface must be slightly different from the dot frequency on the other surface to create the depth illusion. For example, one surface might be printed with a dot frequency of 150 dots per inch, and the other surface might be printed with a frequency of 152 dots per inch.

The difference in the frequency in the dot patterns on surface 62 and 64 results in a moire pattern as previously discussed. If the minimum separation of surfaces 62 and 64 of .03 inches is present, the right and left eye images seen by a viewer are displaced (i.e., there is retinal disparity), and thus an illusion of depth is created. Within some limits, the displacement of the right and left eye images increases with increasing separation of surfaces 62 and 64, and furthermore, the clearness of the moire is reduced as surface separation increases and depth illusion thereby is further enhanced.

If the two planes are arranged so that the lower frequency dot pattern is nearer the viewer (i.e., assume on surface 62) the moire pattern will move in the same direction as any movement of the viewer (motion parallax) and depth illusion is thereby further enhanced. The movement of the moire pattern will be reversed if the higher frequency dot pattern is nearer the viewer. Also, the closer the frequency of the two patterns on surfaces 62 and 64, the greater will be the retinal disparity and motion parallax and thus the greater will be the depth illusion. Accordingly, although the patterns must be of different frequency in order for the invention to function properly, it is preferable that the frequency difference, i.e., the difference between the frequency of lines of dots per inch on the opposed surfaces, be between one and 15 percent of the frequency of the pattern on the front surface.

Figure 4:
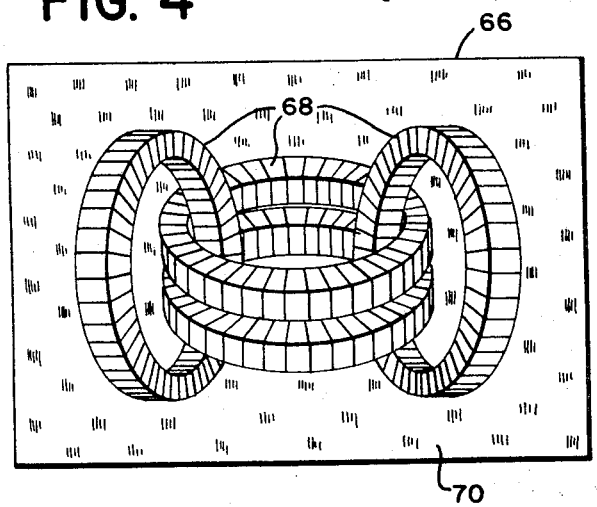
FIG. 4 is a representation of a display in accordance with the present invention.

The motion illusion and depth illusion may be combined in a single display for the creation of both motion and depth illusion. FIG. 4 illustrates one such combined display, but it will be understood that FIG. 4 merely depicts a view looking directly at a combined display and no attempt has been made to emphasize either the motion or depth illusion as shown in FIG. 4. Referring to FIG. 4, a sheet 66 is seen in typical display, sheet 66 being an art sheet as discussed above with respect to the motion illusion, and it will be understood that sheet 66 is cooperatively combined with an appropriate activator or reference sheet for motion illusion. Interlocking rings 68 are shown on sheet 66, these interlocking rings having been formed of different dot pattern frequencies on the back of art sheet 66 in accordance with the procedure discussed above, so that the illusion will be created that these rings are rotating in a desired manner when the activator sheet is being moved. However, the background section 70, including the entire border around the rings 68 and the areas enclosed by the rings but not overlapping with other rings, has dot patterns on both the front and rear surfaces of sheet 66 of slightly different frequencies to produce the depth illusion discussed with respect to FIG. 3. In this manner, the rings 68 not only appear to be rotating, but they also appear to be suspended in space.

In a combined display such as discussed with respect to FIG. 4, it is essential that the dot patterns on the front and back surfaces used to create the depth illusion must be of significantly different frequencies from the dot patterns used to create the display such as the rings 68 and the activator sheet cooperating with the rings 68. Specifically, the dot patterns in the depth and motion illusion sections must not be the same or whole multiple numbers of each other. Preferably, assuming that a frequency of $X$ dots per inch is used in the motion illusion part of the display, the preferred frequency for the depth illusion parts of the display is $NX + \frac{1}{2}X$ dots per inch wherein $N$ is any integer 1 or greater. Furthermore, the depth sections of the display can be attenuated to eliminate stray motion effects by coating the back of the art display sheet 66 with a light diffusing material in those areas in which only the depth illusion is to be created. A typical light diffuser would be fine beaded glass such as a four micron glass bead suspension known as Syloid 978 obtainable from Davison Chemical Co. of Baltimore, Maryland, the beaded glass being suspended in a lacquer and applied in a lacquer coating to the rear surface of display sheet 66 in those areas other than the areas in which the motion illusion is to be created.

Although the depth illusion has been described herein in connection with a composite employing the motion illusion described herein, it will also be understood that other forms of motion illusion could be employed with the depth illusion described herein. For example, the polarizing technique for motion illusion described in U.S. Pat. No. 3,295,915 and United States application Ser. No. 693,633, both of which are assigned to the assignee of the present invention, could be employed for the motion illusion.

From the foregoing description it will be understood by those skilled in the art that the present invention results in a particularly novel and effective motion illusion apparatus and method which may be employed either with or without depth illusion.

While a preferred embodiment has been shown and described, various modifications and substitutions may be made without departing from the spirit and scope of this invention. Accordingly, it is to be understood that this invention has been described by way of illustration and not limitation.

What is claimed is:

1. An animated display device for creating an illusion of motion including:

a first transparent sheet having a dot pattern on at least one surface thereof, said dot pattern on said first sheet being uniform and of a predetermined frequency of dots per inch;

a second transparent sheet having a plurality of sections of dot patterns on at least one surface thereof forming a display, at least some of said sections having dot pattern areas and open areas, the dot patterns in each dot pattern area in a section being of a constant predetermined frequency of dots per inch in the dot pattern area, at least one of the sections being of different dot pattern frequency than another of said sections, and at least some of said sections being of different dot pattern frequency than said first transparent sheet;

said second sheet being overlapped with respect to said first sheet to form moire patterns; and means for moving said first sheet with respect to said second sheet to create an illusion of motion of said display.

2. An animated display as in claim 1 wherein:

said first sheet is an activator or reference sheet, the dot pattern being a printed pattern forming uniform rows of dots; and wherein said second sheet is an art sheet, the dot pattern in each dot pattern area of a section being a printed pattern forming segments of uniform rows of dots within the area, each section being formed in a predetermined shape to form part of said display.

3. An animated display device as in claim 1 wherein:

said dots in said first sheet are aligned in rows at a predetermined angle with respect to an axis of said sheet; and wherein said dots in each dot pattern area of a section of said second sheet are aligned in rows at a predetermined angle with respect to an axis of each section, at least some of said sections being arranged with their axes inclined with respect to said axis of said first sheet.

4. An animated display device as in claim 3 wherein:

said dots on each of said sheets are formed by a standard printing technique.

5. An animated display device as in claim 3 wherein:

the frequencies of said dot patterns in said sections of said second sheet differ from the frequency of said dot pattern on said first sheet by not more than 10 percent of said first sheet dot pattern frequency.

6. An animated display device as in claim 3 wherein:

the inclination of the axis of any of said sections with respect to said axis of said first sheet is more than 8°.

7. An animated display device as in claim 3 wherein:

the dot patterns on said first and second sheets are printed on opposing faces of said sheets.

8. An animated display device as in claim 3 wherein:

said sheets are spaced apart not more than ¼ of an inch.

9. An animated display device as in claim 3 including:

depth display dot patterns on the opposite surfaces of said second sheet in areas other than the areas of said sections, said depth display dot patterns being of slightly different frequencies on each of said opposite surfaces, one of said depth display dot patterns being of a frequency approximately $NX+\frac{1}{2}X$, wherein $X$ is the frequency of the dot pattern in any section and $N$ is any integer.

10. An animated display device as in claim 9 wherein:

said depth display dot patterns on opposite surfaces differ from each other in frequency by from 1 to 15 percent.

11. An animated display as in claim 1 wherein:
said open areas are commensurate with the illusion of motion to be created.

12. An animated display as in claim 1 wherein:
said open areas are formed by removal of dots from a uniform dot pattern in a section.

13. An animated display device as in claim 1 including:
a background section on said second sheet, said background section having a dot pattern thereon of a frequency approximately $NX+\frac{1}{2}X$, where $X$ is the frequency of the dot pattern on said first sheet and $N$ is any integer.

14. An animated display device for creating an illusion of motion including:

a first transparent sheet having a dot pattern on at least one surface thereof, said dot pattern on said first sheet being uniform and of a predetermined frequency of dots per inch throughout said first sheet;

a second transparent sheet having a plurality of sections of dot patterns on at least one surface thereof forming a display, at least some of said sections having dot pattern areas and open areas, the dot patterns in each dot pattern area being of a constant predetermined frequency of dots per inch in the dot pattern area, at least one of the sections being of different dot pattern frequency than another of said sections, and at least some of said sections being of different dot pattern frequency than said first transparent sheet;

said first sheet being overlayed with respect to said second sheet to form moire patterns; and means for moving said first sheet with respect to said second sheet to create an illusion of motion of said display.

* * * * *

PO-1050
(5/69)

UNITED STATES PATENT OFFICE
CERTIFICATE OF CORRECTION

Patent No. 3,811,213  Dated May 21, 1974

Inventor(s) Robert B. Eaves

It is certified that error appears in the above-identified patent and that said Letters Patent are hereby corrected as shown below:

IN THE SPECIFICATION

Column 3, line 23, "seets" should be --sheets--

Column 4, line 26, "from" should be --form--

Column 10, line 15, "of" (first occurrence) should be --if--

Column 12, line 55, after "beer" the numeral --108-- was omitted

Column 13, line 61, "Pricipal" should be --Principal--

Column 15, line 18, "and 15" should be --(1) and fifteen (15)--

IN THE CLAIMS

CLAIM 4 (Column 17, line 1), "laim" should be --claim--

CLAIM 6 (Column 17, line 15), the word "not" was omitted before "more"

Signed and sealed this 1st day of October 1974.

(SEAL)
Attest:

McCOY M. GIBSON JR.
Attesting Officer

C. MARSHALL DANN
Commissioner of Patents